2,748,094

LACQUERS FROM NAPHTHALENE-FORMALDEHYDE RESINS WHICH ARE ELASTIC AFTER DRYING OUT

Hans Krzikalla, Heidelberg, and Frederic van Taack-Trakranen, Ludwigshafen (Rhine), Germany, assignors to Badische Anilin- & Soda-Fabrik Aktiengesellschaft, Ludwigshafen (Rhine), Germany No Drawing. Application April 20, 1953,
Serial No. 349,978

Claims priority, application Germany April 23, 1952

1 Claim. (Cl. 260—28)

This invention relates to a lacquer from naphthalene-formaldehyde resins and from chlorinated paraffins.

It has already been proposed to prepare from naphthalene and formaldehyde, in the presence of acid condensing agents, resins which contain only very little oxygen. Such condensation products, the softening point of which can be varied within wide limits by the choice of suitable condensation conditions, form, from solutions in liquid hydrocarbons, halogen hydrocarbons or esters, lacquer films which have an excellent stability to acid or alkaline substances by reason of their substantially pure hydrocarbon character, and can be used as protective lacquers for apparatus, packages and other purposes.

Protective coatings of the said naphthalene-formaldehyde resins are, however, very brittle and therefore readily scale off if the shape of the substrate is altered. They cannot be softened in a satisfactory manner by addition of the usual softeners, such as difficultly volatile esters or ethers; moreover the said softeners impair the stability of the coating by reason of their oxygen content.

We have now found that solutions of naphthalene-formaldehyde resins containing less than 5%, preferably less than 3% of oxygen and difficultly volatile, highly chlorinated paraffins in organic solvents constitute excellent lacquers which can be worked up into elastic coatings. Chlorinated paraffins having 8 to 30 carbon atoms and a chlorine content of about 20 to 70% are especially suitable. With a chlorine content of up to about 50% these substances are viscous oils and are converted by further absorption of chlorine into viscous solids and finally into resinous compounds. These chlorinated paraffins are very stable substances which are however not suitable by themselves as lacquers by reason of their stickiness. In combination with the oxygen-free or oxygen-poor naphthalene resins, which are also chemically stable, they form lacquer films of high elasticity and high stability to acids and alkalies.

The amount of chlorparaffin to be added can be varied within wide limits depending on the elastification desired and the drying time required. In general there may be used for 100 parts of the naphthalene-formaldehyde resin from 75 to 175 parts of an organic solvent and from 5 to 30 parts of a chlorparaffin. The oxygen-free or oxygen-poor naphthalene-formaldehyde resins may be obtained by reacting naphthalene and formaldehyde or polymers of formaldehyde in acid medium having a molecular range of naphthalene and formaldehyde between 1:0.75 and 1:1.5, preferably between 1:1 and 1:1.3. The lacquers obtained with these solutions are distinguished by a special stability to acids or acid vapours.

Benzene hydrocarbons, such as benzene, toluene, and xylenes are eminently suitable as solvents for the lacquer mixtures, other solvents are dioxane, tetrahydrofurane, cyclohexanone and dimethylformamide.

The lacquers may also contain fillers, as for example graphite, dyestuffs, pigments and the like, and other film-forming, preferably chlorine containing substances compatible with the naphthalene-formaldehyde resin employed, as for example chloro-rubber or polymers or copolymers of vinyl chloride, may also be added thereto.

The following examples will further illustrate this invention but the invention is not limited thereto; the parts are parts by weight.

Example 1

100 parts of a naphthalene-formaldehyde resin, prepared by heating naphthalene and formaldehyde in the molecular ratio 1:1.2 for several hours while using sulphuric acid as catalyst at 95° to 105° C., are dissolved in 150 parts of toluene. To the solution there are then added 6 parts of a difficultly-volatile oily chlorparaffin having a chlorine content of 40% and 5 parts of a 50% solution of chlororubber or of a copolymer of about 75 parts of vinylchloride and about 25 parts of vinylisobutylether in toluene. The lacquer may be used for painting or spraying zinc or iron drums or wooden casks. After drying for 10 hours in the air, a hard, elastic lacquer coating has been formed which protects the metal vessels from attack by acid or alkaline liquids and in the case of wooden casks prevents a swelling of the wood.

Example 2

100 parts of a naphthalene-formaldehyde resin prepared as in Example 1 are dissolved in 100 parts of toluene and to this solution there are added 24 parts of an oily, difficultly volatile chlorparaffin (chlorine content: 30 to 40%). Sheets of iron or other metal painted with this solution dry in 5 to 10 hours in the air with the formation of an adherent film which retains its high elasticity unchanged for months. The elasticity of the film is not diminished even after heating at 100° C. for 3 hours.

Example 3

100 parts of the same naphthalene-formaldehyde resin as in Example 1 are dissolved in 100 parts of xylene, 10 parts of a solid chlorparaffin (chlorine content: 70%) are added and then 34 parts of finely ground graphite are slowly stirred in. The mass is homogenised by passage through a mill. When it is painted onto pipes or other parts of apparatus, a protective coating is formed which dries rapidly and is water-repellent. The coating remains unchanged for months in a hydrochloric acid atmosphere even when the pipes or apparatus are kept at high temperatures by heating during the said periods.

What we claim is:

A lacquer from a naphthalene-formaldehyde resin which yields coatings being elastic after drying comprising a solution of a naphthalene-formaldehyde resin containing less than 5% of oxygen and a substantially non-volatile, highly chlorinated paraffin with a chlorine content of 20% to 70% in an organic solvent, the proportion of the naphthalene-formaldehyde resin to the said chlorinated paraffin being of the order of 100 parts to from 5 to 30 parts.

No references cited.